(12) United States Patent
Joyce et al.

(10) Patent No.: US 6,560,525 B1
(45) Date of Patent: May 6, 2003

(54) INTEGRATED QUEUE ASSIST AND ADAPTIVE CRUISE CONTROL

(75) Inventors: John Patrick Joyce, Grosse Pointe Park, MI (US); Gerald H Engelman, Plymouth, MI (US); Levasseur Tellis, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,452

(22) Filed: Jan. 2, 2002

(51) Int. Cl.[7] ............................................. G06F 17/00
(52) U.S. Cl. ........................... 701/96; 701/68; 701/93; 701/301; 180/168; 180/170
(58) Field of Search ........................... 701/68, 93, 96, 701/301; 180/168, 169, 170, 179; 123/349, 350, 399

(56) References Cited

U.S. PATENT DOCUMENTS

| | | | |
|---|---|---|---|
| 3,725,921 A | * 4/1973 | Weidman et al. | |
| 4,969,103 A | 11/1990 | Maekawa | |
| 5,166,881 A | 11/1992 | Akasu | |
| 5,839,534 A | * 11/1998 | Chakraborty et al. | 180/169 |
| 5,850,176 A | 12/1998 | Kinoshita et al. | |
| 6,009,368 A | 12/1999 | Labuhn et al. | |
| 6,044,321 A | 3/2000 | Nakamura et al. | |
| 6,076,622 A | * 6/2000 | Chakraborty et al. | 180/169 |
| 6,151,539 A | 11/2000 | Bergholz et al. | |
| 6,161,074 A | 12/2000 | Sielagoski et al. | |
| 6,226,593 B1 | 5/2001 | Kurz et al. | |
| 6,233,516 B1 | 5/2001 | Egawa | |
| 6,234,585 B1 | 5/2001 | Harris et al. | |

* cited by examiner

*Primary Examiner*—Gertrude Arthur
(74) *Attorney, Agent, or Firm*—Frank A. MacKenzie

(57) ABSTRACT

An adaptive cruise control system includes a forward-looking sensor generating a range signal corresponding to a distance between the host vehicle and a target vehicle. The forward-looking sensor also generates a range rate signal corresponding to a rate that the distance between the host vehicle and the target vehicle is changing. A controller is electrically coupled to the forward-looking sensor. The controller maintains a preset headway distance between the host vehicle and the target vehicle by adjusting the host vehicle velocity in response to the range signal and the range rate signal. The host vehicle may come to a full stop when the target vehicle is acquired below a predetermined velocity. If the target vehicle is acquired above the predetermined velocity, then a warning is given when braking is required.

19 Claims, 5 Drawing Sheets

INTEGRATED QUEUE ASSIST AND ADAPTIVE CRUISE CONTROL

BACKGROUND OF INVENTION

The present invention relates generally to vehicle adaptive cruise control systems, and more particularly to a method and apparatus for adjusting vehicle speed and maintaining a headway distance in response to a target.

Adaptive Cruise Control (ACC) has reached a level of technical and business readiness such that it is beginning to appear in the consumer market as a comfort and convenience system. Consumer technical enthusiasm for ACC has increased because of their interest in intelligent vehicles and systems such as collision warning and collision avoidance. ACC performs as an enhancement to traditional cruise control by automatically adjusting a set speed, which is set by the vehicle operator, to allow a vehicle to adapt to moving traffic.

Under normal driving conditions the ACC system is engaged with a set speed equal to a maximum autonomous speed that is desired by the operator and the ACC system operates in a conventional cruise control mode. When the vehicle approaches traffic, the ACC system automatically adjusts the set speed to follow the traffic at a desired headway distance. When the traffic clears, the ACC system slowly resumes the speed of the vehicle to the set speed. When the ACC vehicle performs a lane change, and the actual distance to a new target is less than the set headway distance, the ACC vehicle will remain in follow mode. When the vehicle approaches slow traffic, whereby the ACC system determines to reduce speed of the vehicle below a minimum speed for ACC operation, the ACC system is automatically disengaged and the operator manually follows slower vehicles in the slow traffic. When the slow traffic is no longer in front of the vehicle the operator must manually accelerate the vehicle to a velocity above the minimum speed for ACC operation, approximately 40 KPH, before the ACC system is able to resume acceleration to the set speed by depression of a resume button.

During slower stop and go traffic the operator frequently adjusts the speed of the vehicle by applying the brakes or depressing the accelerator. The continuous adjusting of the vehicle speed can become frustrating for the operator over extended periods of time.

Traditional ACC systems were designed to only react to moving targets presented by normal traffic under extended cruise control operation and when the vehicle is traveling at velocities above 40 KPH. Therefore, by operating only when certain conditions exist, the ACC system is compromising the goals of a collision warning or avoidance system.

It would therefore be desirable to develop an ACC system that operates at vehicle speeds below 40 KPH. It would also be desirable for the ACC system to correctly classify targets when traveling at the slower speeds. The ability to operate and classify targets at slower speeds may increase the success of ACC systems in the consumer market and also increase the collision warning capabilities of a vehicle.

SUMMARY OF INVENTION

The foregoing and other advantages are provided by a method and apparatus for adjusting vehicle speed and maintaining a headway distance in response to a target. An ACC system includes a forward-looking sensor generating a range signal corresponding to a distance between the host vehicle and a target vehicle. The forward-looking sensor also generates a range rate signal corresponding to a rate that the distance between the host vehicle and the target vehicle is changing. A controller is electrically coupled to the forward-looking sensor. The controller maintains a preset headway distance between the host vehicle and the target vehicle by adjusting the host vehicle velocity in response to the range signal and the range rate signal. The host vehicle may come to a full stop when the target vehicle is acquired below a predetermined velocity. If the target vehicle is acquired above the predetermined velocity, then a warning is given when braking is required.

The present invention itself, together with attendant advantages, will be best understood by reference to the following detailed description, taken in conjunction with the accompanying figures.

BRIEF DESCRIPTION OF DRAWINGS

In order that the invention may be well understood, there will now be described some embodiments thereof, given by way of example, reference being made to the accompanying drawings, in which.

DETAILED DESCRIPTION

Figure 1:
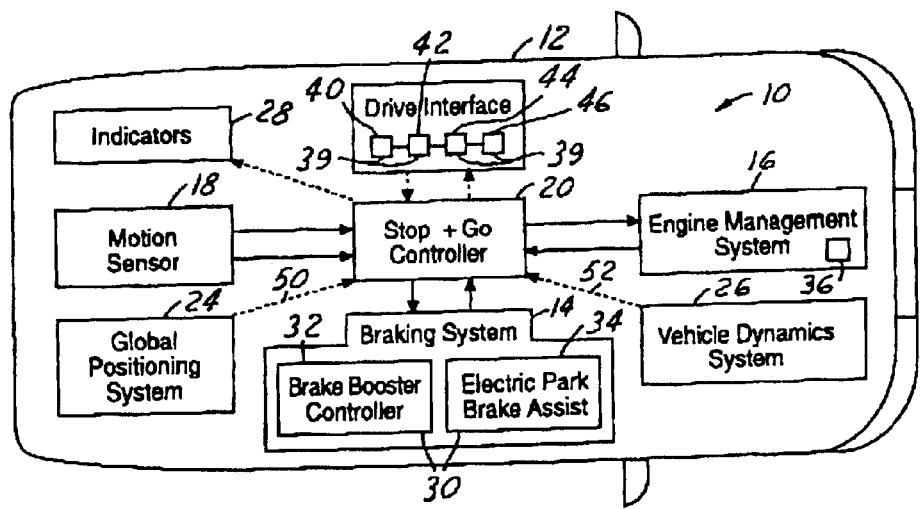
FIG. 1 is a block diagram view of a stop and go adaptive cruise control (ACC) system in accordance with an embodiment of the present invention.

In each of the following figures, the same reference numerals are used to refer to the same components. While the present invention is described with respect to a method and apparatus for adjusting vehicle speed and maintaining a headway distance in response to a target, the present invention may be adapted to be used in various systems including: cruise control systems, forward collision warning systems, collision avoidance systems, vehicle systems, or other systems that may require adaptive speed control.

In the following description, various operating parameters and components are described for one constructed embodiment. These specific parameters and components are included as examples and are not meant to be limiting.

Referring now to FIG. 1, a block diagrammatic view of a stop and go adaptive cruise control (ACC) system 10 in accordance with an embodiment of the present invention is shown. The system 10 is located within a host vehicle 12 that has a braking system 14 and an engine management system 16. System 10 includes a forward-looking sensor 18 for sensing a target in the path of the host vehicle 12. The forward-looking sensor 18 generates a range signal corresponding to a distance between the host vehicle 12 and a target and a range rate signal corresponding to a rate said distance between the host vehicle 12 and said target is changing. A stop and go controller 20 receives the rate signal and the range rate signal and determines whether to signal the braking system 14 or to signal the engine management system 16 as to maintain a preset distance between the host vehicle 12 and the target. The controller 20 maintains the preset distance for host vehicle velocities from zero to 50 KPH. The system 10 may also include other components such as a driver interface 22, a global positioning system 24, a vehicles dynamics system 26, various indicators 28, and other components as will become more evident from the following description.

The braking system 14 may include any vehicle system known in the art that is capable of reducing the velocity of the host vehicle 12. Although, the braking system 14 of the present invention comprises two devices 30 for reducing the velocity of the host vehicle 12, other similar systems may be used. For example a transmission controller (not shown) that is capable of downshifting a transmission of the host vehicle 12 may be used to reduce the host vehicle velocity. The braking system 14 of the present invention includes a brake booster controller 32 and an electric park brake assist 34. The brake booster controller 32 is equivalent to a vehicle operator applying the brakes. The electric park brake assist 34 is used when additional braking power is requested by the controller 20. The electric park brake assist may be used as a fail-safe mechanism when a failure occurs within the booster (not shown) of the braking system 14.

The engine management system 16 may include any host vehicle components that adjust the acceleration of the vehicle. These components may include a vehicle accelerator 36 such as in the present invention, a fuel and air intake control system, an engine timing controller, or other vehicle component or system known in the art that may be used to adjust the velocity of the host vehicle 12.

Forward-looking sensor 18 may be of various type known in the art including a radar sensor, a lidar sensor, a combination of a radar sensor and a camera system or other forward-looking sensor. Although, the forward-looking sensor 18 of the present invention is a single frontal mounted sensor, multiple forward-looking sensors mounted at various locations on the host vehicle 12 may be used. The forward-looking sensors may be front mounted, side mounted, or even rear mounted. The purpose of the forward-looking sensor 18 is to sense position and velocity of a target located in a future path of the host vehicle 12 and relative to the host vehicle 12. The target may be any of the following: a vehicle, a stopped object, a moving object, a bridge, construction equipment, a sign, an animate or inanimate object, or other object. The forward-looking sensor 18 may also gather other information including target angel relative to the host vehicle 12 and yaw rate of the target relative to the host vehicle 12. The additional information allows the controller 20 to more accurately determine the threat of the target as to the host vehicle 12 and the appropriate actions to perform.

Controller 20 may be a microprocessor based controller such as a computer having a central processing unit, memory (RAM and/or ROM), and associated input and output buses. Controller 20 may be a portion of a main control unit, such as a main vehicle controller, or may be a stand-alone controller. The controller 20 of the present invention contains logic for maintaining a preset distance between a target and the host vehicle 12 while operating at a low host vehicle velocity and a midrange host vehicle velocity. The low host vehicle velocity includes approximately any velocity below 40 KPH, including an at rest velocity of 0 KPH. The midrange host vehicle velocity includes approximately velocities greater than or equal to 40 KPH and less than 50 KPH. The controller 20 allows an operator to activate the system 10 at any velocity below 50 KPH. The controller 20, while activated, maintains a preset distance between the host vehicle 12 and the target. The preset distance is maintained when the host vehicle velocity is from 0 KPH up to 50 KPH, from 50 KPH down to 0 KPH, and any other scenario. The controller 20 automatically disengages for host vehicle velocities above 50 KPH at which point traditional ACC systems may take over. The preset distance may be set by an operator or may be set during production of the system 10.

The controller 20 may have an initialization hold time, during which the controller 20 holds the host vehicle 12 stationary until an operator reactivates system 10 to resume operation by pressing on the accelerator 36, pressing on a brake pedal (not shown) within the vehicle 12, switching the reengage switch 44, or by another reactivation method known in the art. The controller 20 may also hold the host vehicle 12 stationary for a predetermined amount of time after the system 10 reduces the velocity of the host vehicle 12 to a complete stop. The controller 20 reactivates the system 10 after the predetermined time has lapsed or waits until the operator reinitializes or deactivates the system 10.

An embodiment of the present invention includes the driver interface 22, as represented by dashed arrows 38. The driver interface 22 may have several different switches 39 including a "ON"switch 40, a "Follow" switch 42, a "Reengage" switch 44, or a "Headway" adjustment switch 46. Switches 39 allow the operator to activate, deactivate, resume operation, and adjust the distance between the host vehicle 12 and a target. The functions that switches 39 perform may be included and automatically implemented through logic within the controller 20. The headway adjustment switch 46 may have several settings for example it may have a short, a medium, or a long setting representing different desired set distances that may be maintained between the host vehicle 12 and a target. The switches 39 may be of various type and style as known in the art.

The global positioning system 24 may be incorporated in conjunction with the forward-looking sensor 18 as to detect environment situations, such as an exit ramp, a round-a- bout, or other environmental situations. This is represented by dashed arrow 50.

The vehicle dynamics system 26 is provided in another embodiment of the present invention, as represented by the dashed arrow 52. The vehicle dynamics system 26 uses vehicle sensors (not shown) to measure inertial information of the host vehicle 12. When instability of the host vehicle 12 occurs, the vehicle dynamics system 26 may deactivate the system 10. By deactivating system 10, a false reaction by the controller 10 may be prevented.

The system 10 may also include the various indicators 28. Some contemplated indicators are as follows. An indicator may be used to inform an operator that the system 10 is holding the host vehicle 12 stationary, that acceleration of the host vehicle 12 is being controlled, or that the controller 20 is stopping the host vehicle 12. An audible or visual indicator may be provided as to warn the operator that the braking performed by the controller 20 is insufficient to slow down the host vehicle 12 and that the operator should intervene.

Referring now to FIGS. 2–10, various possible situations are illustrated that may occur during use of the system 10. Each of these situations may have different logic associated with and stored in the controller 20, so as to perform differently as needed.

Figure 2:
FIG. 2 is a pictorial view of a host vehicle using the stop and go ACC system in a congested traffic situation in accordance with an embodiment of the present invention.
Figure 2:

In FIG. 2, the host vehicle 12 is using the system 10 in a congested traffic situation. The system 10 maintains a preset distance between the host vehicle 12 and a target vehicle 60.

Figure 3:
FIG. 3 is a pictorial view of a host vehicle using the stop and go ACC system while adjusting lanes to avoid a stopped vehicle in accordance with an embodiment of the present invention.
Figure 3:
Figure 3:
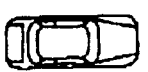
Figure 3:
Figure 3:
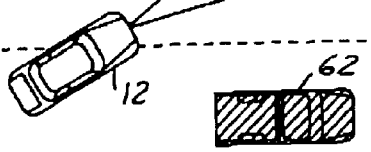

In FIG. 3, the host vehicle 12 is using the system 10 while changing lanes to avoid a stopped vehicle 62. The system 10 detects a vehicle 64 in the future path of the host vehicle 12 and as in FIG. 2 maintains a preset distance between the host vehicle 12 and the detected vehicle 64.

Figure 4:
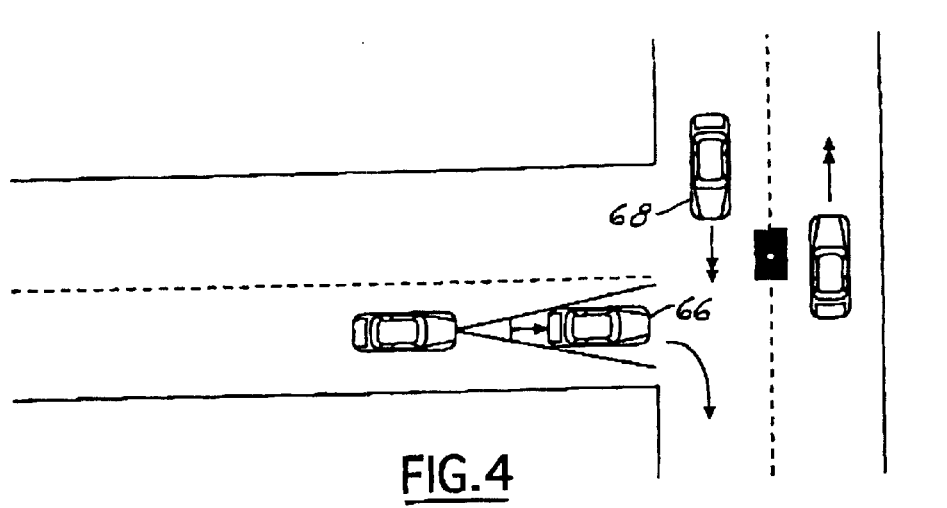
FIG. 4 is a pictorial view of a host vehicle using the stop and go ACC system, while following a target vehicle making a right turn from a complete stop, in accordance with an embodiment of the present invention.

In FIG. 4, the host vehicle 12 is using the system 10 while following a target vehicle 66 making a right turn from a complete stop. In this situation the system 10 may perform several different actions. The system 10 may hold the host vehicle 12 stationary until intervention by an operator, the system 10 may detect an oncoming vehicle 68 and also hold the host vehicle 12 stationary until the oncoming vehicle 68 passes, or the system 10 may determine that the oncoming vehicle 68 is at a safe distance and allow the host vehicle 12 to continue following the target vehicle 66. Actions are determined in response to detected vehicle positioning and traveling velocities relative to the host vehicle 12.

Figure 5:
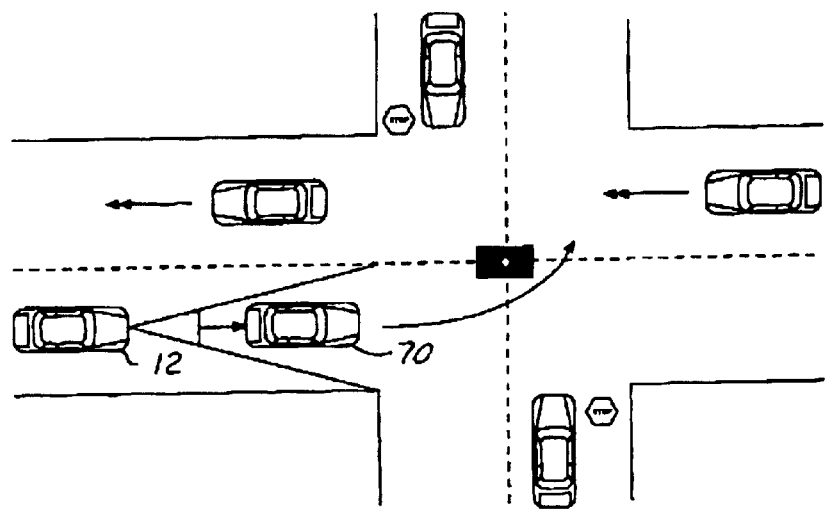
FIG. 5 is a pictorial view of a host vehicle using the stop and go ACC system, while following a target vehicle making a left turn from a complete stop, in accordance with an embodiment of the present invention.

In FIG. 5, the host vehicle 12 is using the system 10 while following a target vehicle 70 making a left turn from a complete stop. As with the situation in FIG. 4 the system 10 may perform several actions. Also as with FIG. 4 the system 10 will determine vehicle positioning using various detection devices described above as to determine what action to perform. Note when the system 10 encounters a situation that it is not familiar with or is unable to determine what action to perform it may indicate this to the operator and wait for operator intervention.

Figure 6:
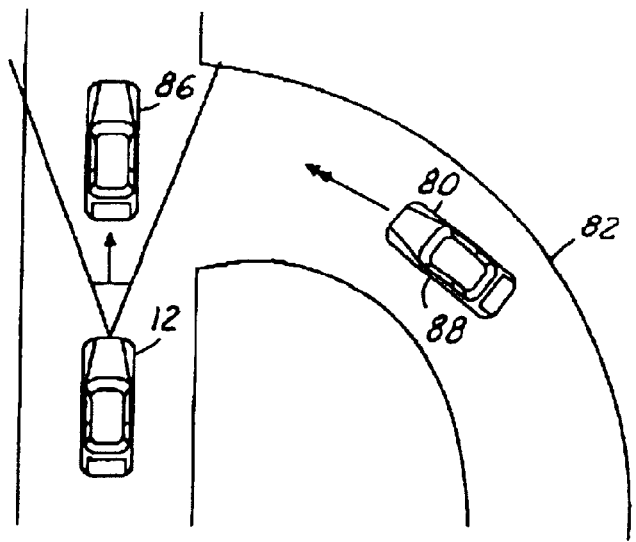
FIG. 6 is a pictorial view of a host vehicle using the stop and go ACC system and encountering merging traffic from an entrance ramp, in accordance with an embodiment of the present invention.

In FIG. 6, the host vehicle 12 is using the system 10 and encountering merging traffic 80 from an entrance ramp 82. Rather than continuing to follow a target vehicle 86 at a preset distance the system 10 may reduce the velocity of the host vehicle 12 as to now follow a new target vehicle 88. Of course, for any of the described situation in this application the controller 20 may be programmed to wait for operator intervention before continuing to act.

Figure 7:
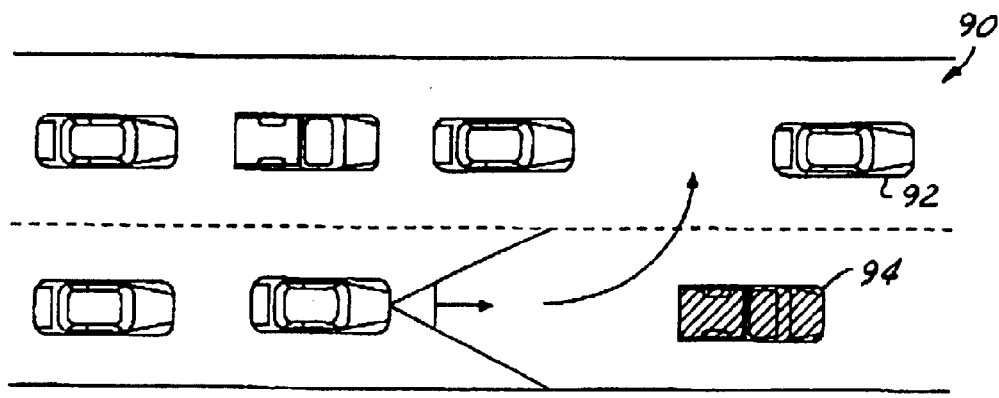
FIG. 7 is a pictorial view of a host vehicle using the stop and go ACC system, while changing lanes in stop and go traffic, in accordance with an embodiment of the present invention.

In FIG. 7, the host vehicle 12 is using the system 10 while changing lanes in stop and go traffic 90. As in other described situations the system 10 may determine to follow a new target vehicle 92 instead of following the original target vehicle 94.

Figure 8:
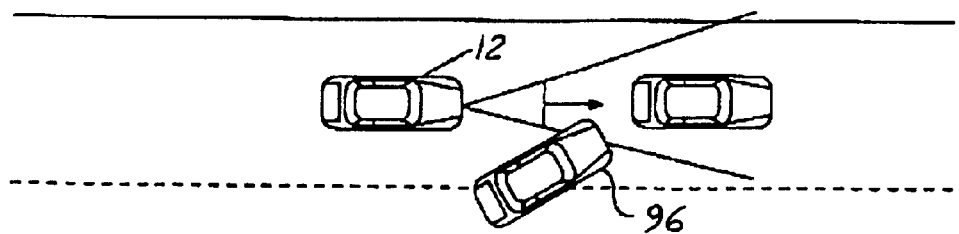
FIG. 8 is a pictorial view of a host vehicle using the stop and go ACC system and encountering a "cut-in" vehicle, in accordance with an embodiment of the present invention.

In FIG. 8, the host vehicle 12 is using the system 10 and encountering a "cut-in" vehicle 96. Similar to that of FIG. 6 the system 10 may determine to reduce the velocity of the host vehicle 12 as to let the cut-in vehicle 96 in front of the host vehicle 12 and then resume following the cut-in vehicle 96 at a preset distance.

Figure 9:
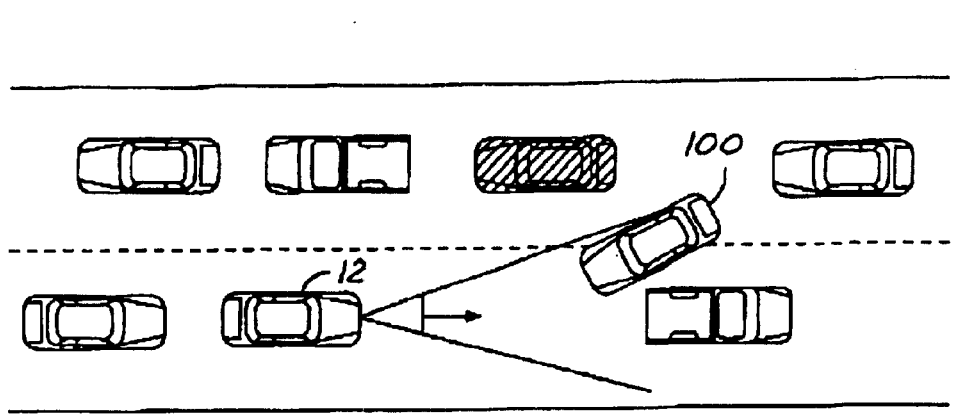
FIG. 9 is a pictorial view of a host vehicle using the stop and go ACC system and encountering an oncoming vehicle, in accordance with an embodiment of the present invention.

In FIG. 9, the host vehicle 12 is using the system 10 and encountering an oncoming vehicle 100. In this situation the system 10 may indicate to the operator to intervene and may also reduce the velocity of the host vehicle 12 to zero KPH as to prevent a collision with the oncoming vehicle 100.

Figure 10:
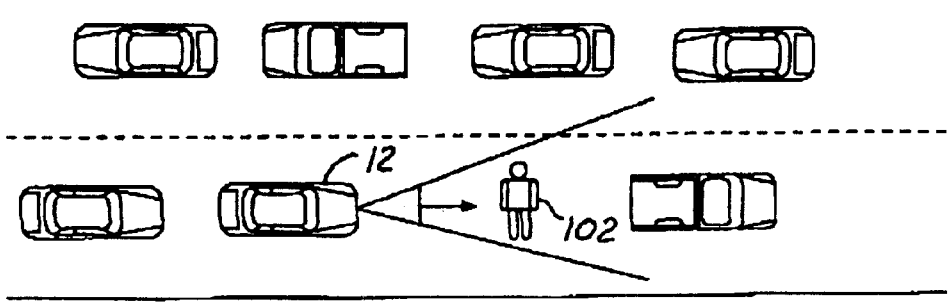
FIG. 10 is a pictorial view of a host vehicle using the stop and go ACC system and encountering an object, in accordance with an embodiment of the present invention.

In FIG. 10, the host vehicle 12 is using the system 10 and encountering a pedestrian 102 or some other object other than another vehicle. The system 10 may determine to reduce the velocity of the host vehicle 12 to 0 KPH as to prevent colliding with the object 102.

Of course, the above-described situations are not all encompassing and the controller 20 may be programmed to act for other situations.

Figure 11:
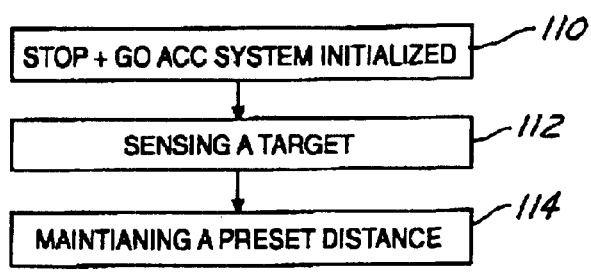
FIG. 11 is flow chart illustrating a method of maintaining a preset headway distance between the host vehicle and a target in accordance with an embodiment of the present invention.

Referring now to FIG. 11, a flow chart illustrating a method of maintaining a preset headway distance between the host vehicle 12 and a target, while traveling at a low or midrange host vehicle velocity of less than 50 KPH, in accordance with an embodiment of the present invention is shown.

In step 110, the system 10 is initialized as described above. The system 10 is activated and determines the relative positioning and relative velocities of objects surrounding the host vehicle 12. In doing so, determining the appropriate action to perform.

In step 112, the system 10 senses a target using a detection device such as the forward-looking sensor 18. A range signal and a range rate signal is generated corresponding to the distance between the host vehicle 10 and the target and the rate of change of this distance, respectively.

In step 114, the system 10 maintains a preset distance between the host vehicle 12 and the target. This may occur in a couple different situations either the host vehicle 12 is stationary and determines to begin accelerating and following the target or the host vehicle 12 is already travel at a certain velocity and adjusts the host vehicle velocity as to maintain the set distance.

Figure 12:
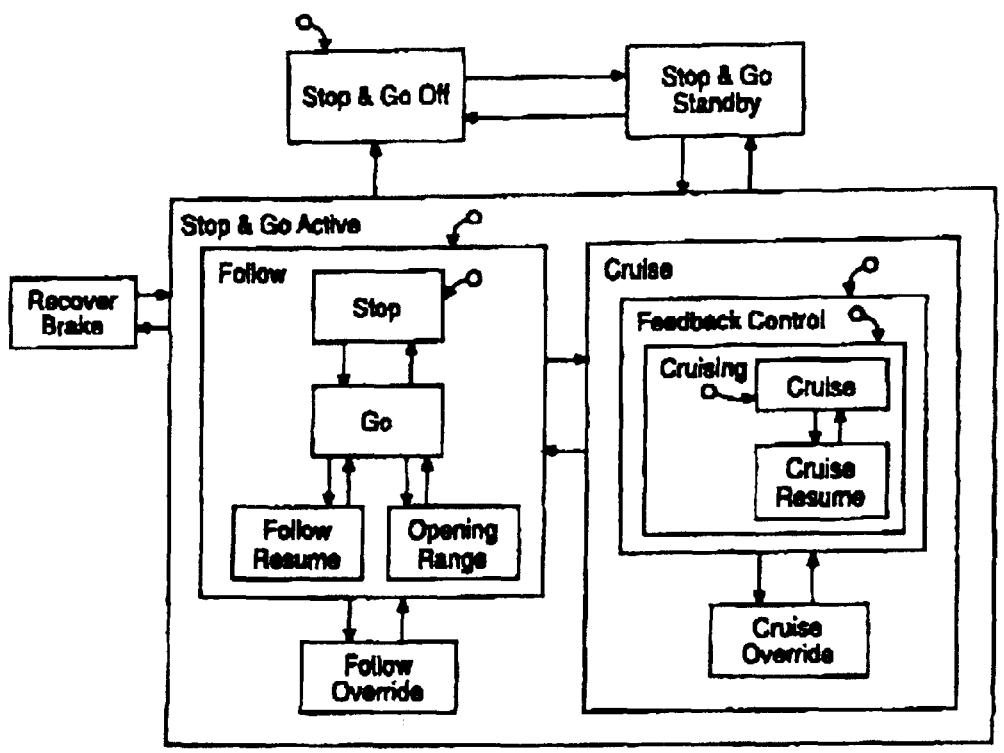
FIG. 12 is a sample state transition diagram illustrating the operation of the stop and go ACC system in accordance with an embodiment of the present invention.

Referring now to FIG. 12, a sample state transition diagram illustrating the operation of the system 10 according to an embodiment of the present invention is shown.

In state Stop and Go Off, the system 10 is deactivated. The system 10 may be sensing objects in a close proximity to the host vehicle 12 as to warn the operator.

In state Stop and Go Standby, the system 10 is in a standby mode. Upon receiving a power on command the system 10 initializes as described above and sits idle until further commanded.

In state Stop and Go Active, the system 10 is activated as to follow and maintain a preset distance between the host vehicle 12 and a target. The system 10 may act as a traditional cruise control system, illustrated by a Cruise state and corresponding sub states, as known in the art or may perform otherwise depending upon the detection of objects in the close proximity of the host vehicle. The system 10 may resort back to the stop and go off state or the stop and go standby state for various reasons as described above.

In state Follow, a target has been detected and the system maintains the preset distance. The preset distance is maintained by four different states, a Stop state, a Go state, a Follow Resume state, and an Opening Range state. The controller 20 monitors the distance between the host vehicle and the target vehicle as well as the relative range rate to determine an appropriate resolved host vehicle velocity. The resolved host vehicle velocity represents a safe host vehicle traveling velocity to maintain the preset distance.

During the Stop state the host vehicle velocity is greater then the target velocity or the distance between them is less than the preset distance. The system 10 reduces the velocity of the host vehicle 12 by signaling the braking system 14.

During the Go state, the difference between the host vehicle velocity and the resolved host vehicle velocity is less than a predetermined value, or the range rate is less than or equal to a predetermined value and the difference in velocity is greater than or equal to zero. The system 10 is signaling the engine management system 16 to not signal the braking system 14. Typically in this state, the host vehicle velocity is approximately equal to the target velocity.

During the Follow Resume state, the difference between the host vehicle velocity and the host vehicle's target velocity is greater than or equal to a predetermined value the system 10 resumes following the target by accelerating or decelerating the vehicle. When the difference between the host vehicle velocity and the host vehicle target velocity is less than the predetermined value than the system 10 returns to the green state.

During the Opening Range state, the range rate between the host vehicle 12 and the target is greater than a predetermined value and the velocity difference between the host vehicle 12 and the target is less than zero. The system 10 reduces the amount that it is accelerating the host vehicle 12 as to prevent a collision. When the range rate is less than the predetermined value the system 10 returns to the green state.

The Stop and Go Active state also includes a Follow Override state. The Follow Override state is performed when either the operator intervenes, a justified malfunction occurs in a host vehicle system, the braking system is insufficiently reducing the velocity of the host vehicle 12, or for other various reasons that may be envisioned by one skilled in the art.

A Recover Brake state is also provided when a problem exists in the braking system 14. The system 10 indicates to the operator that the system 10 is not able to decelerate the host vehicle 12 because of insufficient braking in the braking system 14. The system 10 may apply an emergency brake, such as the electric park brake assist 34, or decelerate the host vehicle 12 using other methods as described above.

The present invention provides an ACC system that is operable for all host vehicle velocities less than 50 KPH. The present invention also reduces the amount of tedious actions that an operator has to perform in stop and go traffic. The aforementioned reviews how the present invention increases collision-warning capabilities of a host vehicle.

The above-described apparatus, to one skilled in the art, is capable of being adapted for various purposes and is not limited to the following systems: cruise control systems, forward collision warning systems, collision avoidance systems, vehicle systems, or other systems that may require adaptive speed control. The above-described invention may also be varied without deviating from the spirit and scope of the invention as contemplated by the following claims:

What is claimed is:

1. An adaptive cruise control system for a host vehicle comprising:
a forward-looking sensor generating a range signal corresponding to a distance between the host vehicle and a target vehicle;
said forward-looking sensor generating a range rate signal corresponding to a rate that said distance between the host vehicle and said target vehicle is changing; and
a controller electrically coupled to said forward-looking sensor and acquiring said target vehicle, said controller including control logic operative to maintain a preset headway distance between the host vehicle and said target vehicle, by adjusting the host vehicle velocity in response to said range signal and said range rate signal, stopping said host vehicle when said target vehicle stops and said target vehicle was acquired below a predetermined velocity, and activating a warning when said target vehicle stops and said target vehicle was acquired above said predetermined velocity.

2. A system as in claim 1 wherein the controller signals a braking system to maintain the preset headway distance.

3. A system as in claim 1 wherein said controller signals an engine management system to maintain the preset headway distance.

4. A system as in claim 1 wherein said controller operates from an initial vehicle rest velocity of 0 KPH.

5. A system as in claim 1 further comprising:
an electric park brake assist;
wherein said controller applies said electric park brake assist while maintaining a headway distance between the host vehicle and said target.

6. A system as in claim 1 wherein said target comprises at least one of a vehicle, an object, and a pedestrian.

7. A system as in claim 1 further comprising an indicator electrically coupled to said controller, said indicator indicating then said controller is maintaining a rest vehicle velocity of zero KPH.

8. A system as in claim 1 further comprising an indicator electrically coupled to said controller, said indicator indicating when said controller is adjusting the acceleration of the host vehicle.

9. A system as in claim 1 further comprising an indicator electrically coupled to said controller, said indicator indicating when said controller is stopping the host vehicle.

10. A system as in claim 1 further comprising an indicator electrically coupled to said controller, said indicator indicating that rate of deceleration is insufficient as to stop behind said target.

11. A system as in claim 1 wherein said controller maintains the host vehicle at a rest velocity of zero KPH for a predetermined duration of time.

12. A system as in claim 1 wherein said controller maintains the host vehicle at a rest velocity of zero KPH until intervention is provided.

13. A system as in claim 1 further comprising:
said forward-looking sensor generating a target angle signal;
wherein said controller maintains a headway distance in response to said target angle signal.

14. A system as in claim 1 further comprising:
said forward-looking sensor generating a yaw rate signal;
wherein said controller maintains a headway distance in response to said yaw rate signal.

15. A adaptive cruise control system for a host vehicle comprising:
a forward-looking sensor generating a range signal corresponding to a distance between the host vehicle and a target vehicle;
said forward-looking sensor generating a range rate signal corresponding to a rate that said distance between the host vehicle and said target vehicle is changing; and a controller electrically coupled to said forward-looking sensor and acquiring said target vehicle, said controller including control logic operative to maintain a preset headway distance between the host vehicle and said target vehicle from a host vehicle velocity of zero KPH, by adjusting the host vehicle velocity in response to said range signal and said range rate signal, stopping said host vehicle when said target vehicle stops and said target vehicle did not exceed a predetermined velocity, and activating a warning when said target vehicle stops and said target vehicle exceeded said predetermined velocity.

16. A method of adjusting the velocity of a host vehicle comprising:

sensing a target vehicle and generating a range signal corresponding to a distance between the host vehicle and said target;

generating a range rate signal corresponding to a rate said distance between the host vehicle and said target vehicle is changing;

maintaining a preset headway distance between the host vehicle and said target vehicle, in response to said range signal and said range rate signal;

stopping said host vehicle when said target vehicle stops and said target vehicle was acquired below a predetermined velocity; and activating a warning when said target vehicle stops and said target vehicle was acquired above said predetermined velocity.

17. A method as in claim 16 further comprising maintaining a headway distance between the host vehicle and said target vehicle, from an initial vehicle rest velocity of zero KPH, in response to said range signal and said range rate signal.

18. A method as in claim 16 further comprising stopping said host vehicle when said target vehicle stops and said target vehicle did not exceed a predetermined velocity.

19. A method as in claim 16 further comprising activating a warning when said target vehicle stops and said target vehicle exceeded said predetermined velocity.

* * * * *